(12) United States Patent
Krammer et al.

(10) Patent No.: US 9,079,549 B2
(45) Date of Patent: Jul. 14, 2015

(54) MODULAR BUMPER ARRANGEMENT FOR A VEHICLE

(75) Inventors: Christoph Krammer, Deutschlandsberg (AT); Christian Schermaier, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/509,613

(22) PCT Filed: Nov. 12, 2010

(86) PCT No.: PCT/EP2010/067419
§ 371 (c)(1),
(2), (4) Date: May 22, 2012

(87) PCT Pub. No.: WO2011/058152
PCT Pub. Date: May 19, 2011

(65) Prior Publication Data
US 2012/0228888 A1 Sep. 13, 2012

Related U.S. Application Data

(60) Provisional application No. 61/260,428, filed on Nov. 12, 2009.

(51) Int. Cl.
*B60R 19/03* (2006.01)
*B60R 19/34* (2006.01)
*B60R 19/12* (2006.01)
*B60R 19/18* (2006.01)

(52) U.S. Cl.
CPC ............... *B60R 19/12* (2013.01); *B60R 19/03* (2013.01); *B60R 2019/1853* (2013.01)

(58) Field of Classification Search
CPC .. B60R 19/03; B60R 19/12; B60R 2019/1853
USPC .............. 293/12–122, 133, 155; 296/12–122, 296/133, 155
See application file for complete search history.

(56) References Cited

U.S. PATENT DOCUMENTS

| | | | | |
|---|---|---|---|---|
| 5,178,425 A | * | 1/1993 | Kumagai et al. | 293/120 |
| 5,942,169 A | * | 8/1999 | Narazaki et al. | 264/40.1 |
| 6,286,879 B1 | * | 9/2001 | Haque et al. | 293/120 |
| 6,318,775 B1 | * | 11/2001 | Heatherington et al. | 293/120 |
| 6,644,701 B2 | * | 11/2003 | Weissenborn et al. | 293/120 |
| 7,093,866 B2 | * | 8/2006 | Toneatti et al. | 293/133 |
| 7,681,700 B2 | * | 3/2010 | Ginja et al. | 188/377 |
| 8,100,444 B2 | * | 1/2012 | Erzgraber et al. | 293/120 |
| 8,118,346 B2 | * | 2/2012 | Ginja et al. | 296/187.03 |
| 8,123,265 B2 | * | 2/2012 | Nilsson | 293/155 |
| 2007/0257497 A1 | * | 11/2007 | Heatherington et al. | 293/120 |
| 2008/0048462 A1 | * | 2/2008 | Zabik | 293/120 |
| 2009/0160204 A1 | * | 6/2009 | Czopek et al. | 293/133 |

FOREIGN PATENT DOCUMENTS

EP 0296383 * 1/1992 ............. B60R 19/18

* cited by examiner

*Primary Examiner* — Dennis H Pedder
(74) *Attorney, Agent, or Firm* — Jordan IP Law, LLC; Todd A. Vaughn

(57) ABSTRACT

A modular bumper arrangement for a vehicle, including a cross-member composed of fiber reinforced plastic, two side parts made of plastic, wherein one side part is arranged or is arrangeable in each case at each of the two ends of the cross-member, and two fastening parts for fastening the bumper arrangement to a body structure of the vehicle, in which one fastening part is fastened or is fastenable to each side part.

18 Claims, 3 Drawing Sheets

MODULAR BUMPER ARRANGEMENT FOR A VEHICLE

CROSS-REFERENCE TO RELATED APPLICATIONS

The present application is a National Stage Application of PCT International Application No. PCT/EP2010/067419 (filed on Nov. 12, 2010), under 35 U.S.C. §371, which claims priority to U.S. Provisional Patent Application No. 61/260,428 (filed on Nov. 12, 2009), which are each hereby incorporated by reference in their respective entireties.

FIELD OF THE INVENTION

The invention relates to a modular bumper arrangement for a vehicle and to a method for producing such a bumper arrangement.

SUMMARY OF THE INVENTION

Bumper arrangements, as used on motor vehicles, serve for absorbing the impact energy released in an impact event situation. Known bumper arrangements comprise a cross-member which is connected to the body structure of the vehicle, for example to the longitudinal members of the vehicle, at customarily two points. In addition, special deformation elements, what are referred to as "crash boxes," can be arranged between the cross-member and the body structure. This may also be prescribed by legal regulations. The crash boxes enable a large amount of impact energy to be consumed when they are compressed in the longitudinal direction thereof.

One task of the cross-member is for the cross-member to be deformed in an impact event and thereby to consume the impact energy released. Furthermore, the cross-member is intended to conduct the impact energy to the crash boxes. The cross-member therefore has to have certain cross sectional dimensions, cross sectional configurations and wall thicknesses, calculated by simulations, in order to meet these specifications. The high energy absorption capability of a large number of steel and aluminum alloys, the ductile deformation behavior thereof and the good numerical moldability thereof are reasons for the predominant use nowadays of metals as the material for the cross-member.

The prior art also discloses cross-members which are made of plastic and are formed as an extrusion profile.

A drawback of the bumper arrangements known from the prior art is that a new bumper arrangement has to be developed for virtually every car model having corresponding, model-specific vehicle proportions. If the width of the longitudinal members of the body structure or even merely the distance, as measured in the longitudinal direction of the vehicle, of the installed position of the bumper arrangement relative to the longitudinal member changes, for example from model to model, this requires the development of a new bumper arrangement. This is associated with the disadvantage of high investment and development costs.

SUMMARY OF THE INVENTION

The present invention is therefore based on the object of indicating a bumper arrangement which is simpler to develop and simpler to produce.

The object is achieved by a modular bumper arrangement for a vehicle, which comprises a cross-member made of fiber reinforced plastic, two side parts made of plastic, wherein one side part is arranged or is arrangeable in each case at each of the two ends of the cross-member, and two fastening parts for fastening the bumper arrangement to a body structure of the vehicle, wherein one fastening part is fastened or is fastenable to each side part.

An advantage of the bumper arrangement according to the invention is the modular construction thereof. This makes it possible to adapt the bumper arrangement more simply and rapidly to different vehicle models or types. If, for example, a bumper arrangement is to be developed for a new vehicle model, in particular with a similar standing height, similar length of the front overhang and similar mass, the modular construction enables, for example, the side parts and the fastening parts from a bumper arrangement according to the invention which is already developed for a different vehicle model to be adopted. Therefore, in order to develop the bumper arrangement for the new vehicle model, essentially only the cross-member needs to be adapted, in particular in respect of the length thereof and/or shape thereof, thus enabling the outlay on development to be reduced and the time expended on development to be shortened.

In accordance with embodiments of the invention, the cross-member and side parts of the bumper arrangement are formed from plastics materials. As a result, a reduction in weight in comparison to a bumper arrangement with a metal cross-member can be achieved. The reduction in weight has a favorable effect, for example, on the fuel consumption and the driving performance of the vehicle. For example, when a bumper arrangement in accordance with embodiments of the invention is used in the front region of the vehicle, the saving on weight means that the weight acting on the front axle is reduced, as a result of which the steering performance is improved and the driving performance is more agile.

The fastening part can be fastened or can be fastenable indirectly or directly to the side part, since, for example, a crash box may be arranged between the two parts.

The cross-member is preferably composed of carbon fiber reinforced plastic and/or of fiber mat containing material, in particular of glass mat reinforced thermoplastic or of endless fiber reinforced plastic, preferably endless fiber reinforced thermoplastic sheets, such as, for example, organosheet or PP-GM 40. These materials make it possible to realize a cross-member which has a lower weight than a comparable metal cross-member, but in which the ratio between tensile strength and density is higher than in the metal cross-member. It is therefore possible to realize a lower weight cross-member which has similar stability in comparison to the metal cross-member or even greater stability than the metal cross-member.

The cross-member preferably has a U-shaped cross section or a hat profile. This makes it possible to realize a low weight cross-member which is stable, is capable of bearing a high load, is tension and compression proof and can particularly readily withstand high impact and high bending loads.

In particular, the length of the cross-member can be selected or predetermined in such a manner that, in the installed position of the bumper arrangement on the vehicle and after arrangement of the side parts at the ends of the cross-member, the cross-member and the two side parts extend over the width of the vehicle in such a manner that the bumper arrangement is fastenable to longitudinal members of the body structure by way of the fastening parts. The width of the bumper arrangement, as measured transversely with respect to the longitudinal direction of the vehicle, can therefore be set by the length of the cross-member, and therefore, by adaptation of the length of the cross-member, the bumper arrangement can be adapted for installation in a certain vehicle type, in particular for mounting onto the body structure of the vehicle type.

In accordance with a preferred embodiment of the invention, the cross-member is designed in the form of a bow, the bending of which is selected in such a manner, in particular corresponding to the contour of an inner surface of an outer skin of the vehicle, that, in the installed position of the bumper arrangement, the cross-member runs at a predetermined distance from the outer skin of the vehicle, in particular directly below the outer skin of the vehicle and along the inner surface. As a result, the deformation space provided for a motor vehicle in the front or rear region can be optimally used. Furthermore, in the event of an impact, the penetration of a collision partner is countered at an early point, thus reducing the risk of damage to, for example, driving or secondary units. In addition, it is thereby possible to ensure that a towing device, such as, for example, a connecting means for a towing lug, which connecting means can be formed on the cross-member, sits in the direct vicinity of, in particular directly below, the outer skin of the vehicle.

The side parts are preferably injection molded. The side parts can thereby be produced rapidly, simply and cost-effectively.

The side parts can be formed from a polypropylene containing material, for example from PP-GF. The side parts are preferably formed from a material which contains polypropylene and an at least 25%, preferably at least 30%, glass fiber portion. As a result, stable and light side parts can be produced in a simple manner by injection molding.

In accordance with a preferred refinement of the invention, each side part is connected nonreleasably to the cross-member. A particularly strong and permanent connection between the cross-member and the respective side part can thereby be realized at low costs.

A fused joint is preferably formed between the cross-member and each side part, by way of which the cross-member and the respective side part are connected nonreleasably to each other. The fused joint may be formed in the following manner: when producing the side part by way of injection molding, the side part is initially present in a hot and liquid state. Before solidification and cooling, the side part and the cross-member, which is composed, for example, of organosheet, are joined together under the action of the injection pressure, as a result of which the fused joint is formed during the cooling of the side part.

For this purpose, the cross-member is positioned in the injection molding die of the side part in such a manner that, when the die halves are closed, sealing between the die and the cross-member is ensured and only those sections of the cross-member which are intended to be wetted with hot melt are located within the mold. The remaining part of the cross-member remains outside the die.

The cross-member and the two side parts can be connected particularly strongly to each other by the fused joint, which increases the security of the bumper arrangement against fracture, in particular in the event of a particularly strong impact. Furthermore, the fused joint ensures that the bumper arrangement has a minimal weight, since no connecting elements, such as screws or rivets, are required. In addition, flange regions which would be required for connecting techniques, such as screwing or adhesive bonding, are dispensed with.

In accordance with embodiments of the invention, a crash box is arranged or is arrangeable between each side part and a fastening part. A crash box which is known per se can consume a large amount of impact energy when it is compressed in the longitudinal direction thereof. It requires a relatively small longitudinal extent for a certain amount of energy to be consumed and requires relatively small use of material.

The side part, the crash box and the fastening part are preferably arranged one behind another, in the installed position and as seen in the longitudinal direction of the vehicle. As a result, the crash boxes, as seen in the longitudinal direction of the vehicle, are located between the cross-member or the side parts arranged thereon and the longitudinal members of the body structure, to which the bumper arrangement is normally fastened by way of the fastening parts. The energy released in the event of an impact is therefore initially absorbed by the crash boxes before the body structure is impaired.

The length of the crash boxes arranged on the side parts can be selected or predetermined with respect to the longitudinal direction of the vehicle in such a manner that, in the installed position of the bumper arrangement, the cross-member is located at a predetermined distance from the outer skin of the vehicle. The crash boxes therefore serve as spacer pieces, by way of which the bumper arrangement can be adapted to a predetermined distance between the longitudinal members of the body structure and the outer skin of the vehicle. As a result, the bumper arrangement can be configured in such a manner that, in the installed position, the cross-member is located directly below the outer skin of the vehicle, which brings about the advantages already indicated above in respect of a possible curved configuration of the cross-member.

In accordance with embodiments of the invention, each crash box is composed of a fiber reinforced plastic, in particular of carbon fiber reinforced plastic and/or glass mat reinforced thermoplastic and/or endless fiber reinforced thermoplastic sheets, such as, for example, organosheet. As a result, a fully functional crash box with good energy absorption properties and with a low weight can be realized.

Each side part can be connected nonreleasably to the crash box arranged thereon, in particular by a fused joint formed between the crash box and the side part. The respective side part can thereby be connected particularly strongly to the crash box, and therefore, in the event of a severe impact, the risk of a fracture at the transition between the crash box and side part is minimized. Furthermore, the fused joint ensures that the bumper arrangement is of minimal weight, since no connecting elements, such as screws or rivets, are required. In addition, those flange regions which would be required for connecting technologies, such as screwing or adhesive bonding, are dispensed with.

The crash box is advantageously arranged on the side part, which is hot and liquid during production by way of injection molding, and therefore the fused joint is formed during the cooling of the hot melt of the side part. For this purpose, the crash box has to be positioned in the injection molding die in such a manner that, when the die halves are closed, sealing between the die and the crash box is ensured, and only those sections of the crash box which are intended to be wetted with hot melt are located within the mold. The remaining part of the crash box remains outside the die.

In accordance with a preferred embodiment of the invention, the cross-member and/or the crash boxes are formed from fiber mat containing material, in particular from endless fiber reinforced thermoplastic sheets, such as, for example, organosheet, and the side parts are formed from a plastics material, preferably a polypropylene containing material, particularly preferably of PP-GF. The material used means that the cross-member and the crash boxes are only moldable to a limited extent. However, the use of the side parts which are not composed of fiber mats makes it possible to bring the bumper arrangement into a desired or predetermined form, in particular by the cross-member and the crash boxes, as described above, being connected to the side parts in a suitable manner. If, in the case of the bumper arrangement, the side parts were also formed from fiber mats, or the bumper arrangement were even formed as a single part from fiber mats, it would be more difficult to bring the bumper arrangement into the desired or predetermined form because of the limited deformability of the fiber mats.

In addition, this would be associated with high die costs. By way of the modular construction of the bumper arrangement in accordance with embodiments of the invention, in which the cross-member and the crash boxes are easily adaptable in length and in which the side parts constitute standard parts which can be used in different bumper arrangements designed for different types of vehicle and are therefore favorable in terms of the production and die costs thereof, a bumper arrangement which is compact, can be produced in a cost-effective manner and is adaptable in a simple manner to a predetermined form can nevertheless be realized.

In accordance with a preferred embodiment of the invention, each fastening part is of plate-like design. A fastening plate of this type can be produced in a simple manner, for example by way of a punching process. Each fastening part is preferably composed of a metal, in particular of aluminum or steel. Each fastening part can have bores in order to fasten the fastening part to the body structure, in particular to a longitudinal member of the body structure, by way of fastening means, such as, for example, screws or rivets.

In the installed position of the bumper arrangement and as seen in the longitudinal direction of the vehicle, each fastening part is preferably arranged behind the respective side part and optionally behind a crash box arranged between the side part and the fastening part. It is thereby ensured that the crash box is located, as viewed in the longitudinal direction of the vehicle, between the cross-member or the side parts and the longitudinal members of the body structure, and therefore, in the event of an impact, the released energy is absorbed by the crash boxes before the body structure is impaired.

Each fastening part can be adhesively bonded to the respective side part or to a crash box arranged between the fastening part and the side part, and therefore the parts can be connected fixedly to one another in a particularly cost-effective manner. In addition, owing to the low weight of the adhesive, the weight of the bumper arrangement is kept low.

A connecting means for a towing lug, in particular in the form of a screw thread, can be formed on the cross-member.

In accordance with embodiments of the invention, the bumper arrangement has a further, second cross-member which, in the installed position, is arranged below and spaced apart from the first cross-member, in which one side part is arranged at each of the two ends of the second cross-member, in which each fastening part is designed in the form of an elongate plate which, in the installed position, extends in the vertical direction and which is connected both to a side part of the first, upper cross-member and to a side part, located therebelow, of the second, lower cross-member, in particular via respective crash boxes. A bumper arrangement designed in such a manner with two cross-member s which are arranged one above the other and are spaced apart from each other can be fitted as one component to a body structure, which reduces the outlay on fitting and the time required for this purpose.

In accordance with embodiments of the invention, a method for producing a bumper arrangement for a vehicle includes a cross-member produced or prepared from fiber reinforced plastic and two side parts are produced or prepared from plastic, in which hot and liquid plastic is used for producing the side parts. A fused joint is formed between in each case one side part and in each case one of the two ends of the cross-member during the cooling of the melt of the side part.

In accordance with a preferred embodiment of the invention, the side parts are produced using hot and liquid plastic, in particular by injection molding. In this case, a hot and liquid side part is in each case fitted at one end of the cross-member in order to form the fused joint between the side part and the cross-member during the cooling of the respective side part. The cross-member in this case is positioned in the injection molding die of the side part in such a manner that, when the die halves are closed, sealing is ensured between the die and the cross-member member, and only those sections of the cross-member which are intended to be wetted with hot melt are located within the mold. The remaining part of the cross-member remains, however, outside the die.

A crash box, produced in particular from a glass fiber reinforced plastic, can be joined in the same manner to each hot and liquid side part such that a fused joint is formed between the respective side part and the crash box joined thereto during the cooling of the side part. Furthermore, a preferably plate-like and/or metal fastening part for fastening the bumper arrangement can be adhesively bonded to a body structure of the motor vehicle.

BRIEF DESCRIPTION OF THE DRAWINGS

The invention is described by way of example below with reference to the attached drawings, in which, in each case in a schematic illustration.

DETAILED DESCRIPTION OF EMBODIMENTS

Figure 1:
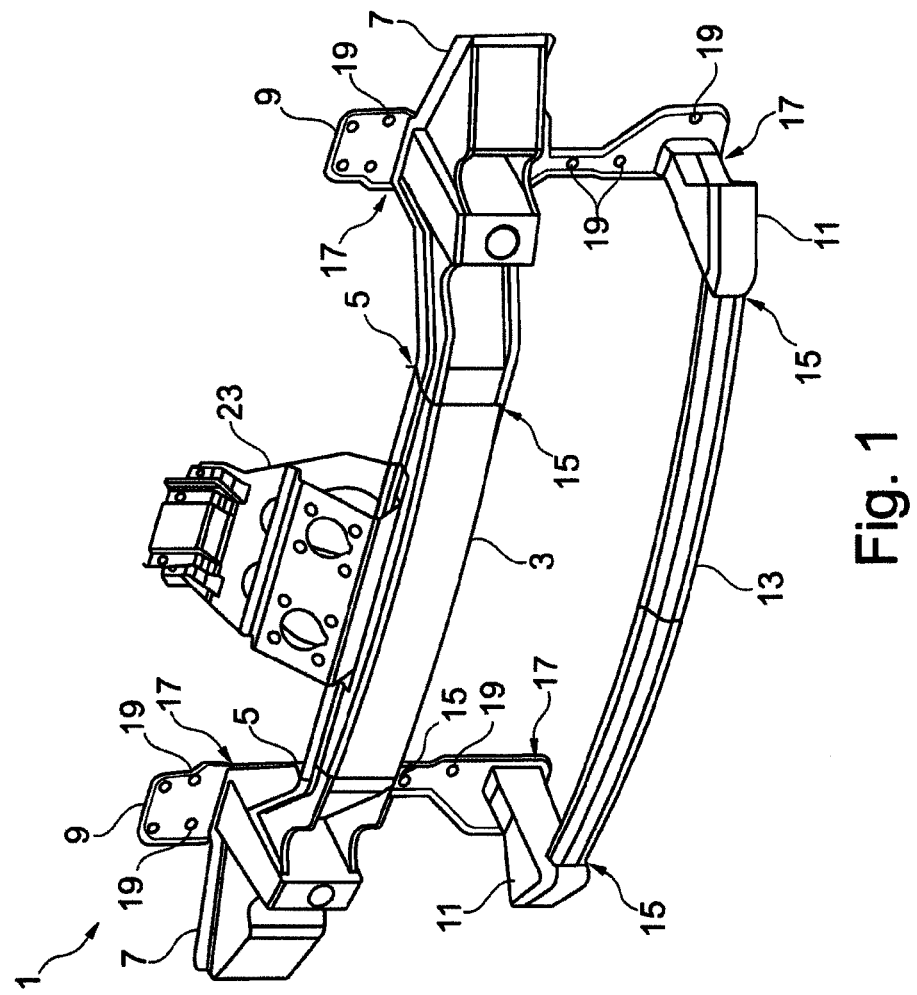
FIG. 1 illustrates a perspective view of a bumper arrangement in accordance with embodiments of the invention.

The bumper arrangement 1 illustrated in FIG. 1 comprises an upper cross-member 3 made of fiber reinforced plastic. One side part 7 is arranged in each case at each end 5 of the cross-member 3. A fastening part 9 of plate-like design is fastened to each side part 7. The bumper arrangement 1 can be fastened to the vehicle body structure in the front or rear region of a vehicle, in particular to longitudinal members of the body structure, via the fastening parts 9.

In the installed position of the bumper arrangement 1, the upper cross-member 3 extends together with the side part 7 arranged laterally thereon in the horizontal direction and transversely with respect to the longitudinal direction of the vehicle. The fastening parts 9 are of elongate design and, in the installed position, extend downward in the vertical direction. In the case of the bumper arrangement 1 illustrated, a lower side part 11 is fastened in each case in the lower region of each fastening part 9, the side part 11 being connected to one end of a lower cross-member 13. The lower part of the bumper arrangement 1, includes the lower cross-member 13 and the side parts 11 arranged laterally thereon, is therefore connected by the fastening parts 9 to the upper part of the bumper arrangement 1, which includes the upper cross-member 3 and the upper side parts 7 arranged laterally thereon. As a result, the bumper arrangement 1 can be fitted to the vehicle as one component by the fastening parts 9 being fastened to the longitudinal members of the body structure, which facilitates the fitting of the bumper arrangement 1.

The cross-members 3, 13 have a hat-shaped cross-section and, in the installed position, are arranged in such a manner that the "hat opening" faces the vehicle. The cross-members 3, 13 are composed of a fiber reinforced plastic, such as, for example, organosheet. As a result, and also because of the shape and the arrangement of the cross-members 3, 13, the cross-members 3, 13 are highly loadable mechanically and are lighter than a metal cross-member.

The side parts 7, 11 are composed of a polypropylene containing material, such as, for example, PP-GF, and are injection molded. In the process, each side part 7, 11, during the production thereof, was arranged while still hot and liquid on the respective cross-member 3, 13 such that a fused joint 15 formed between the cross-member 3, 13 and the respective side part 7, 11 during the cooling of the respective side part 7, 11. As a result, the cross-members 3, 13 were connected nonreleasably to the respective side parts 7, 11 in a particularly strong manner, thus enabling the risk of the bumper arrangement 1 fracturing, in particular in the event of a relatively severe impact, to be reduced.

The fastening parts 9 were adhesively bonded to the respective upper side part 7 and the respective lower side part 11 with the formation of an adhesive joint 17. This results in a fixed connection between the respective fastening part 9 and the side parts 7, 11, where the weight of the bumper arrangement 1 was not noticeably increased because of the low weight of the adhesive.

As illustrated in FIG. 1, each fastening part 9 has a plurality of bores 19. It is therefore possible to fasten the fastening parts 9 and therefore the bumper arrangement 1 to the body structure mechanically by way of screws or rivets.

A holding-down device 23 can be provided centrally above the upper cross-member 3, the holding-down device being fastened to the upper cross-member 3 and to the body structure (not shown) and, in the event of a severe impact, ensuring that the upper cross-member 3 cannot be pushed away upward.

Figure 2:
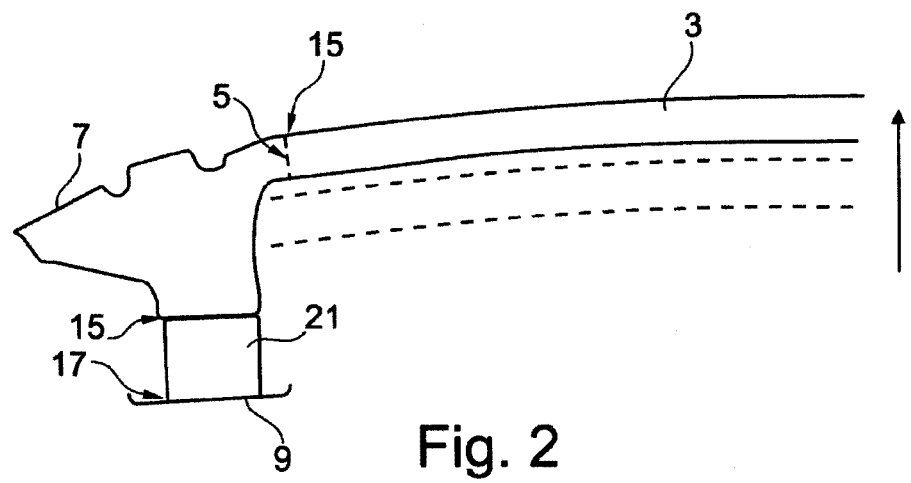
FIG. 2 illustrates an illustration of how the depth of a bumper arrangement can be adapted with respect to the longitudinal direction of the vehicle by the use of crash boxes.

As illustrated in FIG. 2, in the bumper arrangement, a crash box 21 is arranged between the side part 7 and the fastening part 9. In this case, the side part 7, the crash box 21 and the fastening part 9 are arranged one behind another with respect to the longitudinal direction of the vehicle, indicated by the arrow. As further illustrated in FIG. 2, the cross-member 3 is offset in relation to a bumper arrangement without crash boxes by the length of the crash box 21, as measured in the longitudinal direction of the vehicle, cf. the cross-member 3 indicated by dashed lines. By way of the crash box 21, it is therefore possible, depending on the length of the crash box 21, for the position of the cross-member 3 to be varied with respect to the longitudinal direction of the vehicle and to be adapted to different models or types of vehicle, in particular to the distance, which is predetermined for a certain model of vehicle, between the longitudinal members of the body structure and the outer skin of the vehicle, which is located in front of the cross-members. By adaptation of the length of the crash box 21, it is therefore possible to move the cross-member 3 as close as possible to the inner surface of the outer skin of the vehicle in order, in the event of an impact, to keep the distance between the outer skin and the cross-member, which distance is intended to absorb the energy released upon the impact, as small as possible.

The crash box 21 is formed from fiber reinforced plastic, and therefore, on the one hand, the operability of the crash box 21 as an energy absorber is not impaired but, on the other hand, the weight of the bumper arrangement 1 can be reduced. The fastening part 9 is adhesively bonded to the crash box 21 with the formation of an adhesive joint 17. In a corresponding manner to the cross-member 3, the crash box 21 was also arranged on the side part 7, which was still hot and liquid after the injection molding, and therefore a fused joint 15 formed between the side part 7 and the crash box 21 during the cooling of the side part 7.

For the sake of completeness, it should be mentioned that, instead of the crash boxes 21, spacers may also be used in order to adapt the position of the cross-member 3 with respect to the longitudinal direction of the vehicle, in particular whenever crash boxes 21 are intended to be dispensed with in a functional respect or for cost reasons.

Figure 3:
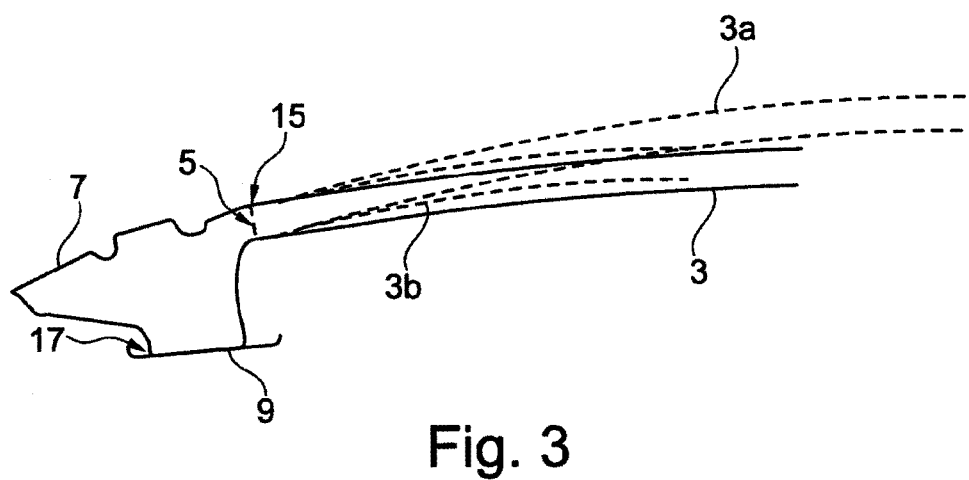
FIG. 3 illustrates how, by changing the curved shape of a cross-member, the bumper arrangement can be adapted, in particular to a shape predetermined by an outer skin of a vehicle.

As illustrated in FIG. 3, differently shaped cross-members 3, 3a, 3b can be arranged on a side part 7. The cross-members 3, 3a, 3b are each of arcuate or bow-shaped cross-sectional design and have different bendings (i.e., arcuate radii). By way of a suitable selection of the bow shape or of the bending, a cross-member 3, 3a, 3b can be adapted to the contour of an inner surface of an outer skin of a vehicle (not illustrated). The cross-member 3, 3a, 3b can in particular be designed in such a manner that, in the installed position of the bumper arrangement, the cross-member runs substantially "parallel" to the inner surface of the outer skin of the vehicle. The modular bumper arrangement can accordingly be adapted to a certain type of vehicle by adaptation of the shape of the cross-member with the side part 7, the fastening parts 9 and optionally the crash boxes 21 being retained.

Figure 4:
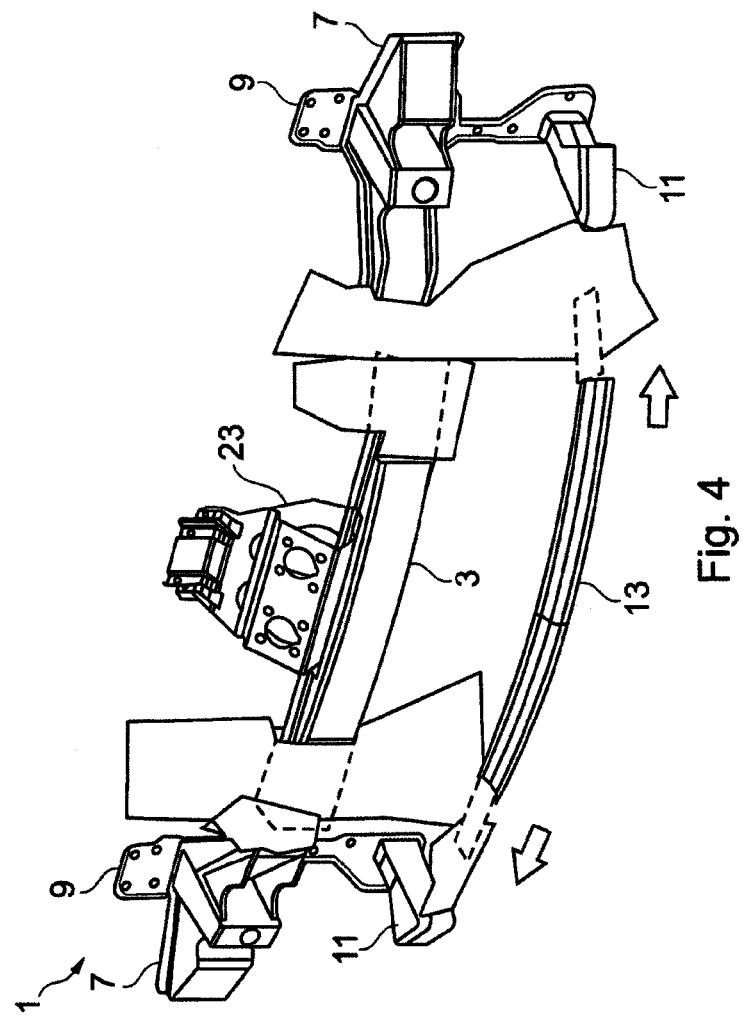
FIG. 4 illustrates how the width of the bumper arrangement of FIG. 1 can be adapted by adaptation of the length of the cross-members to a width predetermined by a vehicle.

As is furthermore illustrated in FIG. 4, the width of the bumper arrangement 1, as measured transversely with respect to the longitudinal direction of the vehicle, can be adapted by adaptation of the length of the cross-members 3, 13 to the width predetermined by a type of vehicle in order to fasten the fastening parts 9, for example, to the longitudinal members (not illustrated) of the body structure.

With the bumper arrangement 1 of modular construction, it is therefore advantageous that, by adaptation of the shape and/or the length of the cross-members 3, 13 and optionally by adaptation of the length of the crash boxes 21, the bumper arrangement 1 can be configured for use in a certain type of vehicle. However, the side parts 7, 11 and/or the fastening parts 9 do not have to be changed but rather can be adopted by a bumper arrangement designed for a different type of vehicle. This enables the outlay on development and the time expended on development to be reduced. In addition, no new dies and/or molds for producing the preferably injection molded side parts 7, 11 have to be provided.

LIST OF REFERENCE NUMBERS

1 Bumper arrangement
3, 3a, 3b Upper cross-member
5 End of the bumper arrangement
7 Upper side part
9 Fastening part
11 Lower side part
13 Lower cross-member
15 Fused joint
17 Adhesive joint
19 Bores 21 Crash box
23 Holding-down device

What is claimed is:

1. A modular bumper arrangement for a vehicle, the modular bumper arrangement comprising:
   a cross-member composed of fiber reinforced plastic;
   side parts composed of plastic and connected non-releasably via a fused joint to a respective end of the cross-member which is produced upon cooling of a hot melt of an injection mold of the side part; and
   fastening parts for fastening the modular bumper arrangement to a body structure of the vehicle, each fastening part configured for fastening to each side part.

2. The modular bumper arrangement of claim 1, wherein the cross-member is composed of at least one of a carbon fiber reinforced plastic and a fiber mat containing material.

3. The modular bumper arrangement of claim 1, wherein the cross-member is composed of at least one of glass mat reinforced thermoplastic and endless fiber reinforced plastic.

4. The modular bumper arrangement of claim 1, wherein the cross-member has an arcuate shape which is configured to correspond to the contour of an inner surface of the outer skin of the vehicle in an installed position of the modular bumper arrangement.

5. The modular bumper arrangement of claim 1, wherein the side parts are composed of a polypropylene containing material.

6. The modular bumper arrangement of claim 1, wherein, relative to the longitudinal direction of the vehicle, the side part and the fastening part are spatially arranged one behind another in an installed position of the modular bumper arrangement.

7. The modular bumper arrangement of claim 1, wherein each fastening part is adhesively bonded to a respective side part.

8. The modular bumper arrangement of claim 1, wherein each fastening part is composed of a metal.

9. The modular bumper arrangement of claim 8, wherein each fastening part includes a plurality of bores configured to permit mechanical fastening of the fastening part to a body structure of the vehicle.

10. A bumper arrangement for a vehicle, the bumper arrangement comprising:
    an upper cross-member composed of fiber reinforced plastic;
    upper side parts composed of plastic and connected non-releasably via a first fused joint to a respective end of the upper cross-member which is produced upon cooling of a hot melt of an injection mold of the upper side parts to the upper cross-member;
    a lower cross-member composed of fiber reinforced plastic and spaced from the upper cross-member;
    lower side parts composed of plastic and connected non-releasably via a second fused joint to a respective end of the lower cross-member which is produced upon cooling of a hot melt of an injection mold of the lower side parts to the lower cross-member; and
    fastening parts fastened to the upper and lower cross members and which permit fastening of the bumper arrangement to a body structure of the vehicle.

11. The modular bumper arrangement of claim 10, wherein the upper cross-member has an arcuate shape which is configured to correspond to the contour of an inner surface of the outer skin of the vehicle in an installed position of the modular bumper arrangement.

12. The modular bumper arrangement of claim 10, wherein the lower cross-member has an arcuate shape which is configured to correspond to the contour of an inner surface of the outer skin of the vehicle in an installed position of the modular bumper arrangement.

13. The modular bumper arrangement of claim 10, wherein, relative to the longitudinal direction of the vehicle, the upper side parts and the fastening part are spatially arranged one behind another in an installed position of the modular bumper arrangement.

14. The modular bumper arrangement of claim 10, wherein, relative to the longitudinal direction of the vehicle, the lower side parts and the fastening part are spatially arranged one behind another in an installed position of the modular bumper arrangement.

15. The modular bumper arrangement of claim 10, wherein the fastening parts are adhesively bonded to a respective one of the upper side parts and the lower side parts.

16. The modular bumper arrangement of claim 10, wherein the fastening parts are composed of a metal.

17. The modular bumper arrangement of claim 16, wherein the fastening parts include a plurality of bores configured to permit mechanical fastening of the fastening part to a body structure of the vehicle.

18. A method for producing a bumper arrangement for a vehicle, comprising:
    providing a cross-member composed of fiber reinforced plastic;
    arranging a side part composed of plastic on a respective end of the cross-member during a hot and liquid state of each injection molded side part;
    forming a fused joint between each side part and the respective end of the cross-member by cooling the hot and liquid injection mold of the side parts to the upper cross-member; and
    fastening, using a fastening part which is fastening to a respective side part, the bumper arrangement to a body structure of the vehicle.

* * * * *